March 24, 1970     P. J. MIGHTON     3,501,872
INTERNAL PIPE BEVELING ATTACHMENT FOR PIPE BEVELING MACHINES
Filed Aug. 8, 1966     5 Sheets-Sheet 1

INVENTOR.
Perceptimus J. Mighton
BY
William S. Dorman
ATTORNEY

INVENTOR.
Perceptimus J. Mighton
BY
William S. Dorman
ATTORNEY

March 24, 1970  P. J. MIGHTON  3,501,872
INTERNAL PIPE BEVELING ATTACHMENT FOR PIPE BEVELING MACHINES
Filed Aug. 8, 1966  5 Sheets-Sheet 4

INVENTOR.
Perceptimus J. Mighton
BY
William S. Dorman
ATTORNEY

March 24, 1970  P. J. MIGHTON  3,501,872
INTERNAL PIPE BEVELING ATTACHMENT FOR PIPE BEVELING MACHINES
Filed Aug. 8, 1966  5 Sheets-Sheet 5
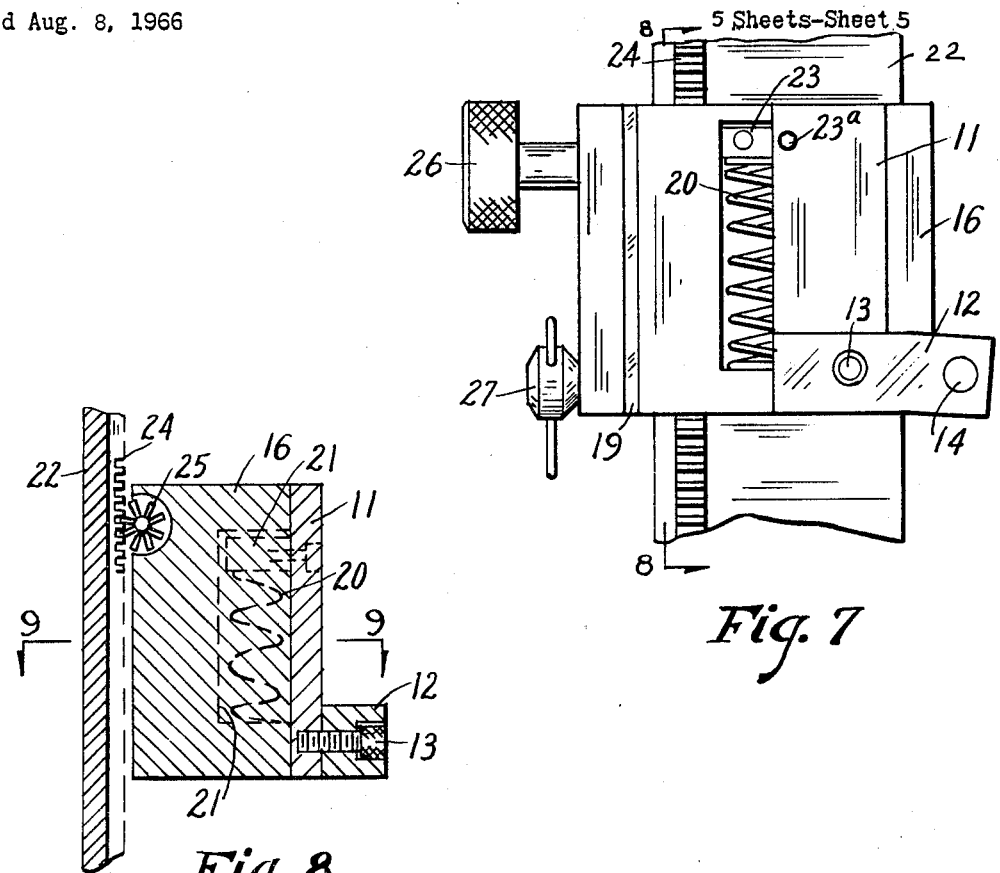
Fig. 7
Fig. 8
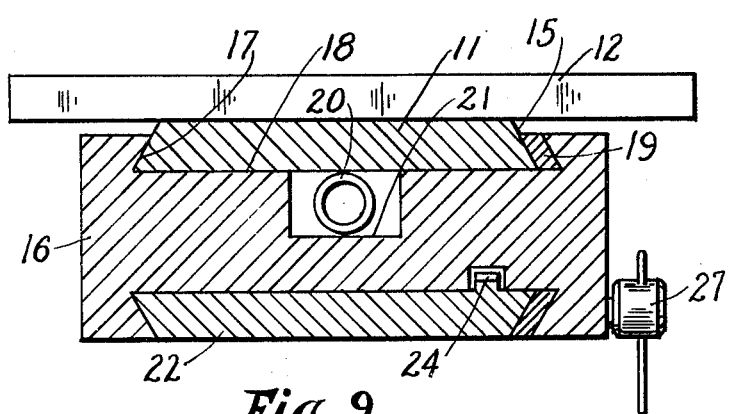
Fig. 9
INVENTOR.
Perceptimus J. Mighton
BY
William S. Dorman
ATTORNEY _United States Patent Office_ 3,501,872
Patented Mar. 24, 1970

3,501,872
INTERNAL PIPE BEVELING ATTACHMENT FOR PIPE BEVELING MACHINES
Perceptimus J. Mighton, Tulsa, Okla., assignor to Mary C. Harter, Tulsa, Okla.
Continuation-in-part of application Ser. No. 293,479, July 8, 1963. This application Aug. 8, 1966, Ser. No. 570,978
Int. Cl. B24b *19/00;* B23k *7/04*
U.S. Cl. 51—241                                    6 Claims

ABSTRACT OF THE DISCLOSURE

A method and means for preparing the end of a tubular member comprising an attachment for a pipe cutting machine for performing an operation on the end of the pipe which is determined or indexed from the configuration of the outer periphery of the pipe. A follower roller or indexing wheel rides around the outer periphery of the pipe and moves radially inwardly or outwardly in accordance with the contour of the surface of the pipe. A machine tool is carried by the indexing wheel support structure and moves around the pipe simultaneously therewith. In addition, the machine tool is positioned complementary with respect to the index wheel for coaction therebetween whereby the resulting operation of the machine tool is referenced from the index wheel in order to provide a uniform thickness for the wall of the pipe subsequent to a beveling operation, or to maintain the end preparation operation in direct relation to the contour of the outer periphery of the pipe.

This application is a continuation-in-part application of my co-pending application Ser. No. 293,479, filed July 8, 1963, and entitled "Out-of-Round Attachment for Pipe Beveling Machines" now Patent No. 3,265,379, issued Aug. 9, 1966. This invention relates to pipe cutting and beveling apparatus. More particularly, but not by way of limitation, this invention relates to an attachment for ring gear type apparatus for cutting or beveling imperfect or out-of-round pipe and the like.

Typically, in cutting and beveling pipe, a cutting torch is attached to a ring gear which is affixed to the pipe and adapted to rotate coaxially thereabout and hence move the cutting torch circumferentilly around the pipe. However, if the pipe is imperfect, i.e. the outer periphery is distorted or out-of-round or contains other imperfections, the cutting torch is unable to efficiently cut the pipe in a smooth manner. Very often the cut will produce an uneven bevel.

In addition, it is frequently necessary to grind or otherwise machining the inner periphery of the pipe or provide an internal bevel thereon. The wall of a pipe is frequently not of a uniform thickness throughout the entire circumference thereof, and the internal grinding operation is extremely difficult to perform. The difficulties of internal machining operations are even greater when the pipe is distorted or out-of-round. The usual method of internal grinding today is through the use of a lathe, or the like, or an internal type grinding machine which indexes or registers the grinding operation from the axial center of the pipe. Of course, it is difficult to establish the center of the pipe, and furthermore, the grinding operation is seldom uniform around the entire periphery of the pipe since most pipe is not truly round, and because of the non-uniformity of the wall thickness.

The present invention contemplates a novel attachment for a pipe cutting machine which is particularly designed and constructed for performing an operation on the pipe which is determined or indexed from the configuration of the outer periphery of the pipe. The novel apparatus is provided with a follower roller or indexing wheel which rides around the outer periphery of the pipe as the pipe cutting machine travels therearound and automatically moves radially inwardly and outwardly in accordance with the contour of the pipe. A grinding machine or other cutting tool is carried by the indexing wheel support structure and moves around the pipe simultaneously therewith. The angular position of the grinding machine with respect to the longitudinal axis of the pipe may be varied as desired to provide an internal bevel for the pipe, or substantially any other desired grinding action thereon, with the indexing or grinding reference being maintained from the outer periphery of the pipe. Thus, the resulting inner periphery of the pipe will be substantially identical in configuration with the outer periphery thereof to provide a uniform thickness for the wall of the pipe subsequent to the grinding or other machining operation, or the like.

Accordingly, it is a primary object of this invention to provide an attachment for pipe cutting devices of the type secured to the ring gear of a pipe cutting machine of the type wherein the ring gear is adapted to be rotated circumferentially about the pipe and whereby a substantially straight and true bevel cut or machining operation results.

It is another object of this invention to provide an out-of-round attachment used in circumferentially rotated ring gear type pipe beveling machines wherein a grinding tool, or the like, is adapted to move around the pipe according to the regularity or irregularity of the outer periphery of the pipe closely adjacent thereto.

It is still another object of this invention to provide an out-of-round attachment for pipe beveling machines wherein a roller member or feeler wheel moves around the outer periphery of the pipe for indexing the movement of a grinding tool in a manner whereby a grinding operation, or the like, may be performed on the pipe in relation to the configuration of the outer periphery thereof.

It is still a further object of this invention to provide an out-of-round attachment for pipe beveling machines of the type heretofore described wherein the cutting torch or other machining tool may be rotated in either a clockwise or counterclockwise direction around a pipe without distortion or unever cutting operations.

Another object of this invention is to provide an out-of-round attachment for pipe beveling machines wherein the required tension of the pipe follower roller may be readily adjusted and maintained by the operator.

Another object of this invention is to provide an out-of-round attachment for pipe beveling machines wherein an internal grinding operation may be performed which results in a substantially uniform wall thickness around the circumference of the pipe.

Other and further objects and advantageous featuers of the present invention will hereinafter more fully appear in connection with a detailed description of the drawings in which:

FIGURE 7 is a partial elevational view, partly cut away, of a portion of the apparatus embodying the invention.

FIGURE 8 is a sectional view taken on line 8—8 of FIGURE 7.

FIGURE 9 is a sectional view taken on line 9—9 of FIGURE 8.

Broadly, this invention concerns an out-of-round attachment for pipe cutting machines of the type wherein a cutting torch, grinding tool, or other cutting tool is adapted to be circumferentially rotated about the pipe for cutting, and preferably beveling pipe ends for facilitating future welding operations, and the like. The apparatus is so constructed that the axis of the pipe follower roller or indexing wheel and the means to provide a resilient load to the roller are aligned in the same plane. An adjustable grinding machine bracket is adjustably and vertically retained on a main support guide. The torch or cutting tool bracket includes a pipe follower roller or indexing wheel adapted to be positioned adjacent the outer periphery of the pipe. A bracket or holder member is adapted to be secured to the pipe cutting machine, and preferably the ring gear thereof, whereby the main support guide and the cutting tool bracket secured thereto may be moved around the outer periphery of the pipe simultaneously with the ring gear. Spring means is provided for cooperating between the holder member and main support guide for maintaining a predetermined or preselected tension on the follower wheel against the pipe in order to firmly retain the wheel in engagement with the outer periphery of the pipe as the apparatus moves circumferentially therearound. In addition, the spring means permits the wheel to move radially inwardly or outwardly in accordance with variations or distortions of the outer periphery of the pipe. The movement of the wheel causes the main support guide and cutting tool bracket to move simultaneously radially inwardly and outwardly in conformance with the configuration of the outer periphery of the pipe whereby any cutting or machining operation performed on the pipe by the cutting tool will be referenced from the outer periphery of the pipe as determined by the following movement of the roller therearound.

Figure 1:
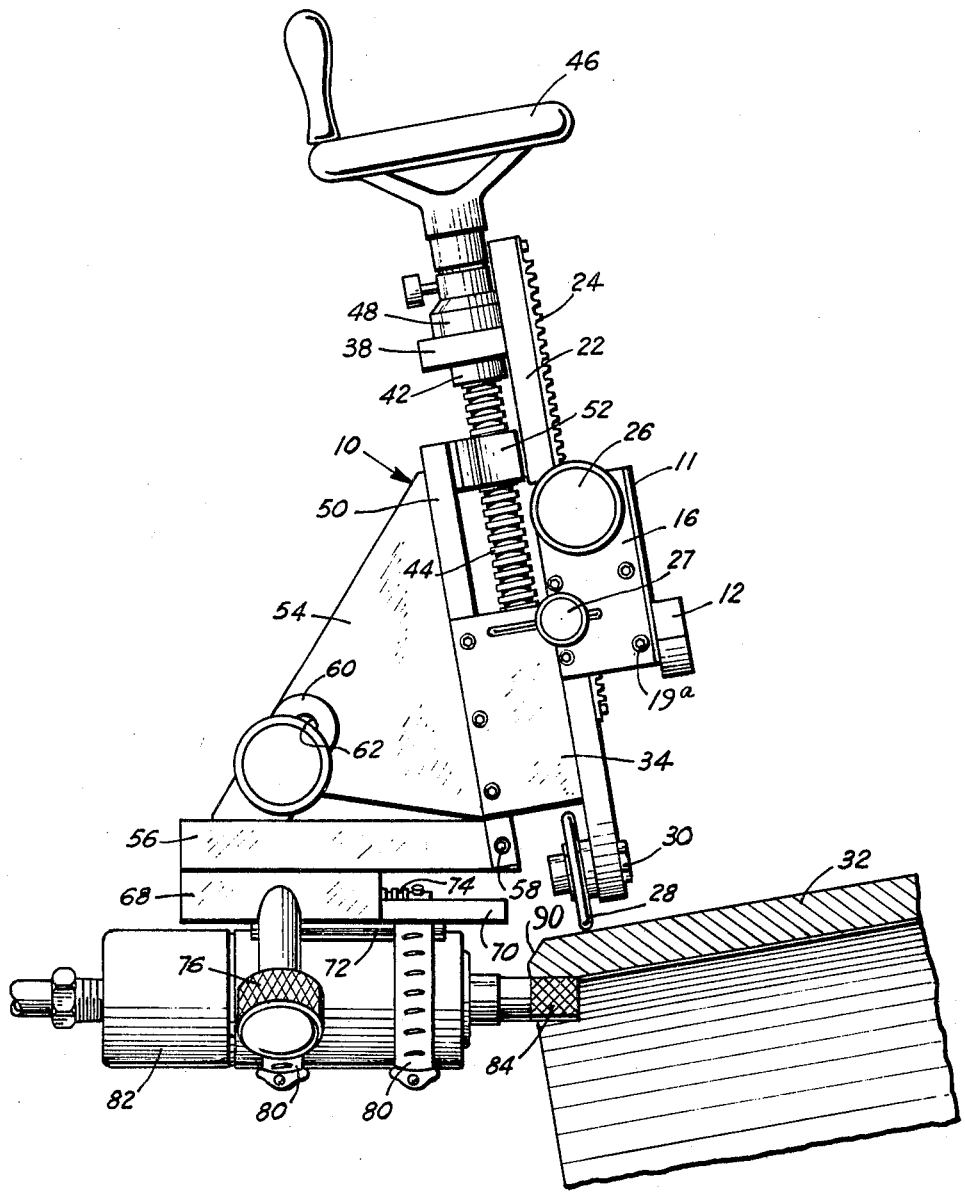
FIGURE 1 is a side elevational view of a pipe cuting attachment embodying the invention as installed on a pipe section with the pipe depicted in section for purposes of illustration.
Figure 2:
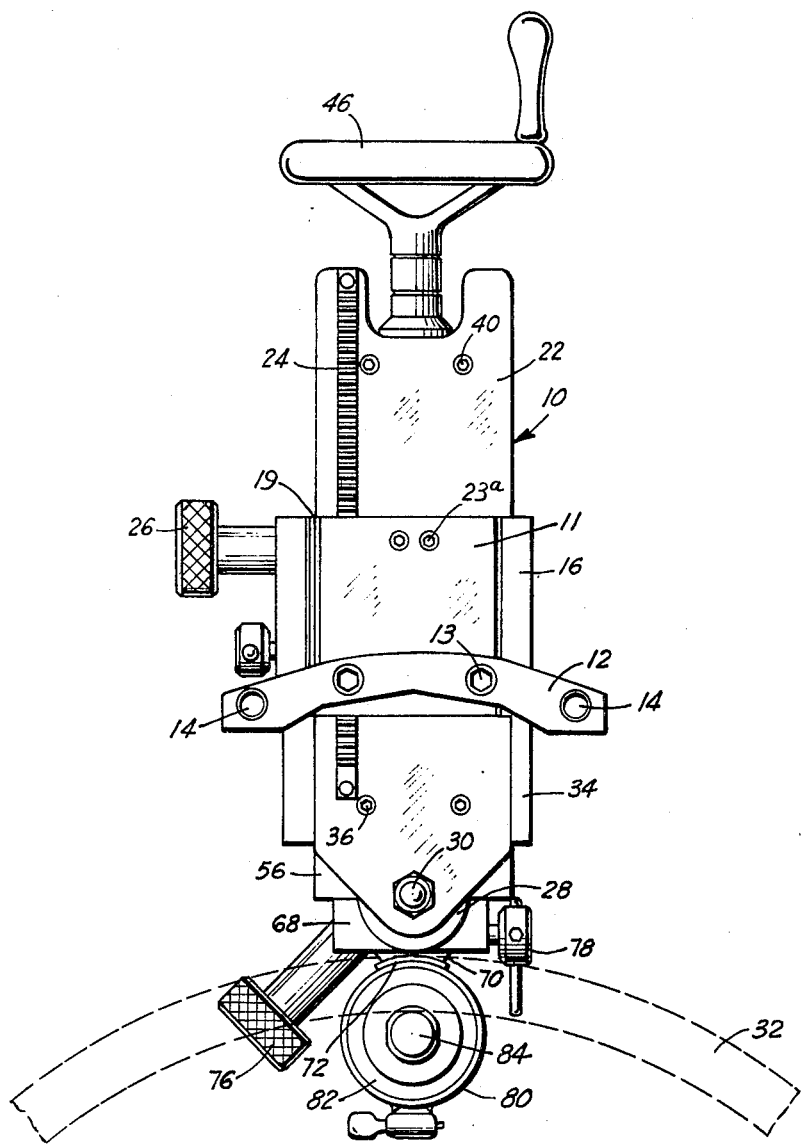
FIGURE 2 is a front elevational view of a pipe cutting attachment embodying the invention as associated with a pipe section.
Figure 3:
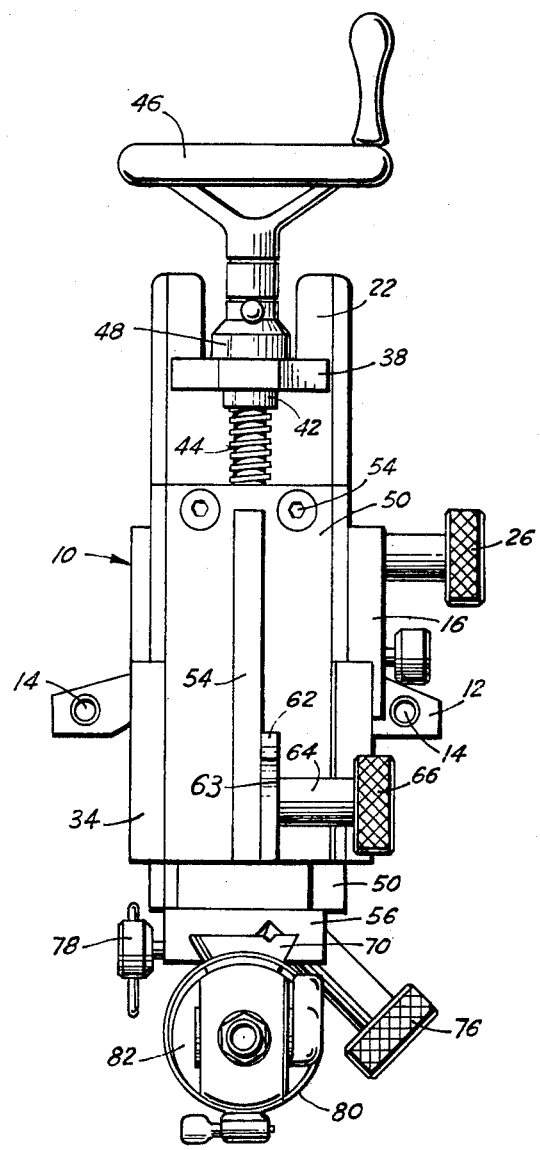
FIGURE 3 is a rear elevational view of a pipe cutting attachment embodying the invention.

Referring to the drawings in detail, and particularly FIGURES 1 through 3, the out-of-round attachment of this invention is generally designated by the numeral 10 and is adapted to be readily attached to a pipe beveling machine (not shown) by means of a rear bracket 12 having a plurality of spaced apertures 14 provided therethrough for receiving suitable bolts, studs, or the like (not shown) for securing thereof to the pipe beveling machine, as is well known. The bracket 12 is removable secured to a slide member 11 in any suitable manner, such as by a plurality of Allen screws 13, (FIGURE 2) or the like. The slide 11 is reciprocally mounted in a support guide member 16 in any suitable manner. For example, each longitudinal side edge of the side 11 may be beveled as shown at 15 in FIGURE 9 for engagement with complementary V-shaped grooves 17 which form the opposite sides of a recess 18 provided in one face of the guide 16 for receiving the slide 11 therein. A suitable wedge member 19 is preferably disposed in one of the V-grooves 17 to provide a shim or spacer for the slide 11. The wedge may be retained in position within the groove in any suitable manner, such as a plurality of screws 19a. The screws 19a preferably extend through the guide 16 into engagement with detents (not shown) provided in one side edge of the wedge 19 whereby the wedge 19 is retained in position in the V-groove 17 but permitted a slight freedom of movement to facilitate the reciprocal movement of the slide 11 with respect to the guide 16.

A helical spring 20 is mounted in a groove 21 provided in the recess 18 of the support 16. The groove 21 is preferably closed at the upper and lower ends thereof as shown in FIGURE 7 and the lower end of the spring 20 rests on the lower closed end of the groove 21. An apertured block member 23 is anchored at the upper end of the spring 20 and is slidably disposed in the groove 21 whereby the spring 20 constantly urges the block 23 in a direction toward the upper closed end of the groove 21. The slide member 11 may be removably secured to the block member by means of Allen screws 23a, or the like, whereby the slide member 11 and bracket 12 are yieldbly retained in position in the guide 16.

A forward grinding or machining tool bracket 22 is oppositely disposed from the slide 11 and is slidably secured to the support 16 in any suitable manner, such as by a dovetail groove construction (not shown) similar to the slidable connection between the slide member 11 and guide 16. A rack member 24 is secured to one face of the bracket 22 and cooperates with a suitable gear or pinion 25 journaled within the support member 16 in any well known manner for rotation by the knob 26 whereby rotation of the knob 26 in one direction will rotate the pinion to move the support 22 with respect to the guide 16, and rotation of the knob 26 in an opposite direction will move the bracket 22 in an opposite direction with respect to the giude 16. The bracket 22 may be securely locked in substantially any desired position with respect to the guide 60 as determined by the manipulation of the rack 24 and cooperating pinion, and in any suitable manner, such as by the locking screw or lock member 27 which extends through the guide 16 to provide a pressure engagement against the edge portion of the bracket 22.

A follower roller or indexing wheel 28 is journaled at one end of the bracket 22 in any suitable manner as indicated at 30 and is adapted for disposition against the outer periphery of a pipe section 32 upon proper positioning of the bracket 22 with respect to the guide 16 as will be hereinafter set forth. The bracket 22 and guide 16 will move radially inwardly and outwardly or will reciprocate with respect to the slide 11 simultaneously or as a unit by virtue of the locking engagement between the lock means 27 and bracket 22 during operation of the apparatus 10 and against the action of the spring (not shown) as will be hereinafter set forth.

A block member 34 is secured to the bracket 22 oppositely disposed from the guide 16 and may be secured to the bracket 22 in any suitable manner such as by a plurality of Allen screws 26 or the like. The block 34 is preferably disposed in the proximity of the wheel 28. An apertured flange or bracket 38 is secured to the bracket 22 on the same face thereof as the block 34 and is spaced from the block 34 as particularly shown in FIGURE 1. The flange 38 may be secured to the bracket 22 in any suitable manner, such as by a plurality of Allen screws 40. A suitable bushing 42 is journaled in the flange 38 for rotation, but is retained against longitudinal movement with respect thereto in any well known manner. A threaded shank 44 extends from the bushing 42 in a direction toward the block 34 and preferably bears against the upper surface of the block 34 as particularly shown in FIGURE 1, and for a purpose as will be hereinafter set forth. A suitable hand wheel 46 is secured above the bushing 42, as viewed in the drawings, and in any well known manner for facilitating rotation of the shank 44 and, if desired, a collar 48 having suitable micrometer indications (not shown) inscribed around the outer periphery thereof may be provided for rotation simultaneously with the shank 44 in order to facilitate rotational calculations during operation of the apparatus 10 as will be hereinafter set forth.

An additional slide member 50 is reciprocally secured to the block 34 and oppositely disposed from the bracket 22 for independent movement with respect to the block and bracket 22. The slide 50 may be slidably secured to the block 34 in any suitable manner, such as by a complementary dovetail tongue and groove arrangement (not shown). A boss 52 having an internally threaded aperture (not shown) extending therethrough is secured to the slide 50 in any suitable manner, such as by the screws 54 and extends in a direction toward the bracket 22 for receiving the threaded shank 44 therethrough. It will be apparent that rotation of the shank 44 in one direction will move the bracket 52 and slide 50 in a direction toward the block 34 whereas rotation of the shank 44 in an opposite direction will move the bracket 52 and slide 50 in a direction away from the block 34.

A substantially centrally disposed triangular support or web member 54 is secured to the outer face of the slide 50 and extends substantially perpendicularly outward therefrom. A base member 56 is pivotally secured to the lower end of the slide 50 in any suitable manner as shown at 58 (FIGURE 1) whereby the angular disposition of the base member 56 with respect to the slide 50 may be varied as desired. An upwardly extending arm 60 is carried by the base 56 and is provided with a slot or elongated aperture 62 for receiving a reduced threaded end (not shown) of a shank 64 therethrough. The reduced end of the shank 64 extends into threaded engagement with the web member 54 whereby the knob 66 and shank 64 may be utilized for locking the arm 60 between the web 54 and a shoulder 63 of the shank 64. Thus the arm 60 may be locked in substantially any desired position with respect to the web 54 in order to provide the desired angular position of the block 56 with respect to the slide 50. Of course, it will be apparent that the block 56 may be pivotally secured to the slide 50 in any suitable manner and there is no intention to limit the securing and locking means to that depicted herein.

A block member 68 is carried on the lower or outer face of the base member 56 and is provided with a reciprocal slide member 70 having a cradle or machine tool receiving member 72 secured thereto in any suitable manner. The slide member 70 is provided with a rack member 74 on the inwardly directed face thereof for cooperation with a gear or pinion member (not shown) journaled within the block 68 in a similar manner as the pinion 25 and rotatable by the knob 76 whereby rotation of the knob 76 in one direction causes the slide 70 to move in one direction with respect to the block 68 and rotation of the knob 76 in an opposite direction causes the slide 70 to move in an opposite direction with respect to the block 68. Any suitable locking means, such as depicted at 78, may be utilized for engaging the slide 70 in order to securely lock the slide in substantially any preselected position with respect to the block 68.

The cradle 73 is preferably provided with tool holding clamps 80, or the like, for securely retaining a power source 82, such as an air motor, or the like, but not limited thereto, to the slide 70. The power source or motor 82 is provided with any suitable grinding tool or other machine tool 84 in order to provide the desired machining operation on the pipe section 32 as will be hereinafter set forth.

OPERATION

The operation of the out-of-round attachment of this invention as described and claimed herein occurs after the rear bracket 12 and slide member 11 are secured to a circumferentially rotating ring gear member (not shown) of a typical pipe beveling and cutting machine (not shown) by bolted connection through the apertures 14. After the beveling machine is affixed in position on the pipe section 32 in the usual manner (not shown), the locking screw or lock member 27 may be released from engagement with the bracket 22 whereby the knob 26 may be manually rotated for operation of the rack 24 and cooperating pinion to position the outer periphery of the roller 28 against the outer periphery of the pipe 32.

When the roller 28 is brought into engagement with the pipe 32, continued radially inward movement of the roller and bracket 22 will be precluded, and the continued rotation of the knob 26 will cause the guide 16 to move radially outwardly from the pipe with respect to the stationary bracket 22, and against the action of the spring. This radially outward movement of the guide 16 compresses the spring, and when the desired spring tension is reached, the guide 16 and bracket 22 may be locked together by the locking device 27. This spring tension maintains the roller 28 in a constant, positive engagement with the outer periphery of the pipe 32 during operation of the apparatus 10.

Thereafter, or before, as desired, the power source 82 and grinding or other machining tool 84 may be positioned with respect to the pipe as required to perform the machining operation thereon. The angular position of the base member 56 may be varied by releasing the engagement or backing off the shank 64 with respect to the web 54 whereby the slotted arm 60 may be moved to the proper position for assuring the required angular position of the base 56 in order that the power source or motor 82 may be positioned at the desired angle with respect to the longitudinal axis of the pipe 32. The arm 60 may be locked in the selected position by tightening the engagement of reduced end of the shank 64 with the web 54 whereby the arm 60 is wedged or locked between the face of the web and the shoulder 63 of the shank 64, as is well known.

The relative radial position of the tool 84 and motor 83 with respect to the pipe 32 may be varied by movement of the slide member 50. This is accomplished by manual rotation of the wheel 46. Rotation of the wheel 46 in one direction will move the slide 50 and motor 82 in a radially inward direction with respect to the pipe by virtue of the engagement between the shank 44 and the threaded aperture of the flange 52 and due to the fact that the end of the shank 44 engages the upper surface of the block 34. Rotation of the wheel 46 in an opposite direction will move the slide 50 and motor 82 in a radially outward direction with respect to the pipe.

The relative longitudinal position of the power source 82 and grinding tool 84 with respect to the pipe 32 may be adjusted by releasing the locking engagement of the locking member 78 whereby the knob 76 may be manually rotated for moving the slide 70 with respect to the block 68. When the tool 84 has been positioned at the desired position with respect to the pipe for performing the machining operation thereon, the slide 70 may be locked in position by the locking means 78, as is well known.

Subsequent to the proper adjustment of the apparatus 10 with respect to the pipe 32, the ring gear member (not shown) of the pipe beveling machine (not shown) is rotated about the pipe in the usual manner, either mechanically or automatically, and at the desired rotational speed. As the follower roller or indexing wheel 28 drops into depressions in the outer periphery of the pipe 32, or raises with irregularities in the circumference of the pipe, the affixed grinding or machining tool 84 likewise moved radially inwardly and outwardly with respect to the pipe. The adjusted spring tension between the guide member 16 and slide 11 is sufficient to maintain the follower roller 28 in a positive engagement with the pipe throughout the rotation of the wheel around the pipe and over all the irregularities which may exist in the outer periphery of the pipe.

One important feature of this invention is the ability to rotate the device circumferentially about the pipe 32 in any direction because the axis of the follower roller 34 and the working axis of the spring are in the same aligned plane. With the device of applicant's invention one pipe end may be cut or beveled or otherwise machined by rotating the mechanism in one direction, and then in the next machining operation the apparatus may be rotated in the opposite direction and thereby prevent and kinks in the welding gas or air operating fluid supply lines.

Figure 5:
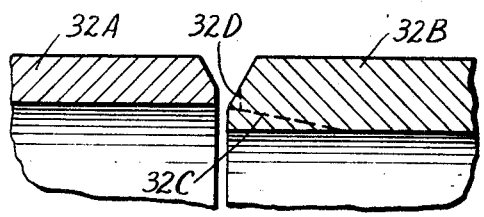
FIGURE 5 is a broken sectional view of a pair of adjacent pipe sections illustrating a typical grinding operation in dotted lines.

Whereas the apparatus 10 may be utilized for performing many machining operations on a pipe section, one particular function thereof is depicted in FIGURES 5 and 7. There are many installations wherein it is necessary to weld two abutting pipe sections having differing wall thicknesses, such as shown at 32A and 32B wherein pipe section 32B is of a greater wall thickness than pipe section 32. In a pipe welding operation it is important that the abutting ends of the pipe be in substantial longitudinal alignment, with the inner and outer peripheries of the abutting ends substantially identical in diametrical size. Accordingly, the inner periphery of the thick walled pipe section 32B must be ground or otherwise machined off to provide an inner diameter at the end thereof which is substantially identical in size with the inner diameter of the end of the pipe section 32A.

Figure 4:
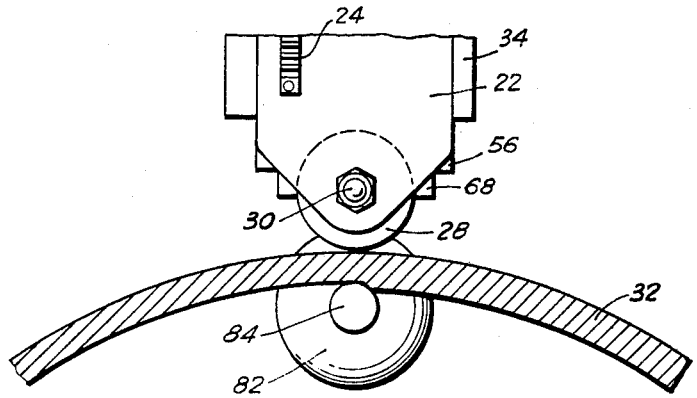
FIGURE 4 is a sectional view taken on line 4—4 of FIGURE 1.

The apparatus 10 may be secured to the pipe section 32B as hereinbefore set forth and the grinding tool 84 may be positioned adjacent the inner periphery of the pipe sections 32B at the desired angle for grinding thereof to a configuration as indicated in dotted lines at 32C. The grinding tool 84 may then be rotated around the inner periphery of the pipe to perform the grinding operation as particularly shown in FIGURE 4 the position of the grinding tool 84 is indexed by the position of the wheel 28 bearing against the outer periphery of the pipe.

Figure 6:
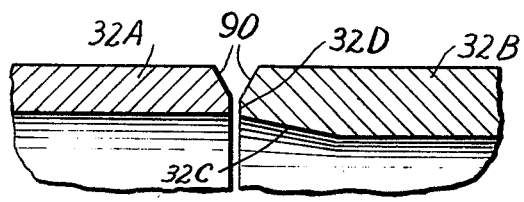
FIGURE 6 is a view similar to FIGURE 5 depicting the pipe sections subsequent to the grinding operation.

Subsequent to this first grinding operation, the angular position of the motor 82 and grinding tool 84 may be varied to position the tool 84 at substantially right angles with respect to the longitudinal axis of the pipe 32B and the end of the pipe section 32B may be provided with a flat surface as indicated in dotted lines at 32D. Of course, this last grinding operation may be performed wth substantially any desired matching apparatus, but it is of expediency to utilize a single apparatus as shown herein to perform the various operations required. Subsequent to the above mentioned grinding or machining operation, the abutting pipe ends of the pipe sections 32A and 32B will appear substantially as shown in FIGURE 6, and the pipe welding operation may be performed in the usual manner for uniting the two pipe sections.

An alternate method of machining the flat end surface 32D may be to provide the motor 82 with a cutting tool (not shown) having the grinding surface on the outer end thereof substantially perpendicularly disposed with respect to the longitudinal axis thereof. In this instance, the motor 82 and tool carried thereby would preferably be disposed in substantial alignment with the axis of the pipe 32B and backed off until the outer end or grinding surface of the grinding tool may be brought into engagement with the outer end of the pipe section 32B to perform the grinding operation resulting in the flat end 32D.

In addition, it is anticipated that substantially any type of tool may be secured to the base 56 for performing a variety of cutting operations on the pipe section, both internally and externally, For example, it is sometimes necessary to provide an annular groove around the flat end of a pipe section. This is particularly difficult to accomplish on large diameter pipe. The out-of-round attachment of the present invention may be readily utilized for machining this type of annular groove by utilizing a grinding tool (not shown) of the type wherein the grinding head portion thereof is of a substantially spherical configuration. In this operation, it may be preferable to position the motor 82 and grinding tool substantially in longitudinal alignment with the pipe section and in such a manner that the grinding tool will be brought into engagement with the flat end of the pipe at the desired diameter or radius for the location of the annular groove. The apparatus 10 may then be utilized in the manner as hereinbefore set forth for cutting the annular groove in the flat end as the device moves circumferentially around the pipe.

Of course, the external bevel as shown at 90 normally provided on abutting pipe sections prior to a welding operation may be machined by use of the apparatus of the present invention. The position of the machining tool may be adjusted for placing the grinding or machining tool adjacent the outer periphery of the pipe end in order to perform the external beveling operation. Furthermore, in instances wherein particularly thick walled pipe is to be internally ground, or otherwise machined, it has been found that the use of a grinding tool requires extremely long periods of time to complete the machining or grinding operation, and, accordingly, it is preferable to perform these operations with a cutting torch. Of course, the usual cutting torch (not shown) may be secured to the base 56 in lieu of the motor 82 and the torch may be properly positioned with respect to the pipe section whereby the apparatus 10 may be utilized to perform the desired operation on the pipe section. It will be apparent that all of the machining or grinding operations performed on the pipe by use of the apparatus 10 will be referenced or indexed from the outer periphery of the pipe, thus assuring that the wall thickness of the machined pipe will be substantially uniform throughout the circumference of the pipe, and the inner periphery will conform to the configuration of the outer periphery of the pipe.

From the foregoing it will be apparent that the present invention provides a novel attachment for a pipe beveling machine, or the like, wherein machining or grinding operations may be performed on a pipe section in a manner wherein the machining operation is indexed or referenced from the outer periphery of the pipe. A follower roller or indexing wheel rides circumferentially around the outer periphery of the pipe during operation of the pipe beveling machine. The machining or grinding tool is carried by the wheel support structure in a manner whereby the tool moves both circumferentially and radially simultaneously with the indexing wheel, thus assuring that the function being performed by the tool is directed or referenced by the contour of the outer periphery of the pipe. The novel out-of-round attachment is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. An out-of-round attachment for a pipe beveling machine comprising a guide member yieldably secured to the pipe beveling machine for circumferential movement around a pipe section, wheel support means movably secured to the guide member, a single indexing wheel journalled on the wheel support means and yieldably maintained in engagement with the outer periphery of the pipe by the guide member and wheel support means, slide means carried by the wheel support means and reciprocally movable with respect thereto, means cooperating between the wheel support means and slide means to provide said reciprocal movement of the slide means, and machine tool means adjustably secured to the slide means and engageable with the pipe adjacent said indexing wheel for performing a machining operation thereon upon actuation of the pipe beveling machine, said machine tool and indexing wheel being disposed substantially oppositely and working in opposition providing oppositely directed forces on the pipe between the machine tool and indexing wheel, and said indexing wheel and machine tool being simultaneously circumferentially movable with respect to the pipe and simultaneously yieldably retained in engagement with the pipe during the machining operation whereby the machining operation is referenced from the outer periphery of the pipe.

2. An out-of-round attachment for a pipe beveling machine comprising bracket means rigidly secured to the pipe beveling machine for circumferential movement around the outer periphery of a pipe section, a guide member movably secured to the bracket means, spring means cooperating between the guide member and bracket means to provide a yieldable engagement therebetween, a support plate movably secured to the guide member oppositely disposed from the bracket means, means cooperating between the support plate and guide member for moving the support plate with respect to the guide member, locking means cooperating between the guide member and support plate for locking thereof to provide unitary movement therebetween, indexing wheel means journalled on the support plate and disposed adjacent the outer periphery of the pipe, block means rigidly secured to the support plate oppositely disposed from the guide member, threaded shank means journalled on the support plate means for rotation only with respect thereto and having one end bearing against the upper surface of the block means, a slide movably secured to the block means, means carried by the slide plate for cooperating with the threaded shank means to provide for reciprocal movement of the slide plate with respect to the block means, base means pivotally secured to the slide plate, lock means cooperating between the base means and slide plate for locking the base means in a preselected angular position with respect to the slide plate, machine tool holder means slidably secured to the base means, means cooperating between the holder means and base means to provide said slidable movement therebetween, locking means cooperating between said holder means and base means for locking the holder means to the base means, and machine tool means carried by the holder means and engageable with the pipe adjacent the indexing wheel means for performing a machining operation thereon, said machining tool and indexing wheel being disposed substantially oppositely and being maintained in yieldable engagement with the pipe by said spring means to provide working opposition of forces on the pipe between the indexing wheel and machine tool for providing coordinated movement between the indexing wheel and machine tool whereby the machining operation of the machine tool is referenced from the outer periphery of the pipe.

3. An out-of-round attachment for a pipe beveling machine comprising guide means yieldingly secured to the pipe beveling machine for circumferential movement around the outer periphery of a pipe section, wheel support means adjustably secured to the guide means, single indexing wheel means journalled to the wheel support means and maintained in yieldable engagement with the outer periphery of the pipe section by the guide means and wheel suport means during the circumferential movement of the guide means therearound, machine tool support means adjustably secured to the wheel support means, machine tool means movably secured to the machine tool support means and engageable with the pipe section adjacent the indexing wheel means for performing a machining operation theeron, said machine tool and indexing wheel being disposed substantially oppositely and being movable in unison around the circumference of the pipe, and means yieldably retaining said machine tool in engagement with the pipe simultaneously with the indexing wheel and working in opposition thereto whereby the machining operation is referenced from the outer periphery of the pipe.

4. An out-of-round attachment for a pipe beveling machine as set forth in claim 1 wherein rack and pinion means is provided between the guide member and wheel support means for providing relative movement therebetween, and locking means is provided for locking the guide member and wheel support means together for simultaneous movement therebetween.

5. An out-of-round attachment for a pipe beveling machine as set forth in claim 1 wherein threaded shank means is journaled to the wheel support means for rotative movement only with respect thereto, and means is provided on the slide means for engagement by the threaded shank means to transmit reciprocal movement of the slide means with respect to the wheel support means upon rotation of the threaded shank.

6. An out-of-round attachment for a pipe beveling machine as set forth in claim 1 wherein said machine tool is both pivotally and slidably secured to the slide means for facilitating adjusting of the machine tool with respect to the pipe for the machining operation.

References Cited

UNITED STATES PATENTS

| 3,265,379 | 8/1966  | Mighton      | 266—23    |
| 2,914,891 | 12/1959 | Nix          | 51—241    |
| 3,044,224 | 7/1962  | Finkes       | 51—241    |
| 3,067,651 | 12/1962 | Hogden et al.| 51—241 X  |
| 2,755,609 | 7/1956  | Sylvester    | 51—241    |

OTHER REFERENCES

French addition 6,057, the 2nd addition to 349,132. May 23, 1906. Societe Anonyme l'Oxhydrique Francaise.

JAMES L. JONES, JR., Primary Examiner

U.S. Cl. X.R.

266—23